United States Patent [19]

Enderle et al.

[11] Patent Number: 5,199,796
[45] Date of Patent: Apr. 6, 1993

[54] GAS PRESSURE BEARING

[75] Inventors: Eckhard Enderle, Aalen-Dewangen; Peter Ahnelt, Oberkochen, both of Fed. Rep. of Germany

[73] Assignee: Carl-Zeiss-Stiftung, Heidenheim/Brenz, Fed. Rep. of Germany

[21] Appl. No.: 920,039

[22] Filed: Jul. 27, 1992

[30] Foreign Application Priority Data

Aug. 3, 1991 [DE] Fed. Rep. of Germany ....... 4125802

[51] Int. Cl.⁵ .............................................. F16C 32/06
[52] U.S. Cl. ..................................... 384/100; 384/12
[58] Field of Search ............ 384/12, 99, 100, 103–105, 384/114, 121

[56] References Cited

U.S. PATENT DOCUMENTS

| | | | |
|---|---|---|---|
| 4,045,098 | 8/1977 | Blondeel | 384/104 |
| 4,449,834 | 5/1984 | Franken et al. | 384/99 |
| 4,560,213 | 12/1985 | Enderle et al. | 384/12 |
| 4,710,034 | 12/1987 | Tittizer et al. | 384/110 |
| 4,869,601 | 9/1989 | Scott | 384/100 |

FOREIGN PATENT DOCUMENTS

| | | |
|---|---|---|
| 0143471 | 5/1985 | European Pat. Off. . |
| 0434645 | 6/1991 | European Pat. Off. . |
| 3010741 | 9/1981 | Fed. Rep. of Germany . |
| 3441426 | 8/1985 | Fed. Rep. of Germany . |
| 2197422 | 3/1974 | France . |
| 2485668 | 12/1981 | France . |
| 2027137 | 2/1980 | United Kingdom . |

Primary Examiner—Thomas R. Hannon
Attorney, Agent, or Firm—Eugene Stephens & Associates

[57] ABSTRACT

A load-compensating gas bearing which exhibits high total rigidity over a large range of loads. The bearing consists of a deformable disk (3) that is supported by, but is not fixed to, a circular support (6) that is rigidly mounted to a base element connected with the machine part (1) being supported by the bearing. The disk (3) is held and centered only by a cylindrical insert (5) that is also used to supply the supporting gas to the bearing span. The bearing side of the deformable disk is provided with a hard plastic coating for protection in the event the gas supply is discontinued; and in one preferred embodiment, the circular support (6) is mounted to a base element that is integral with the machine part being supported.

12 Claims, 4 Drawing Sheets

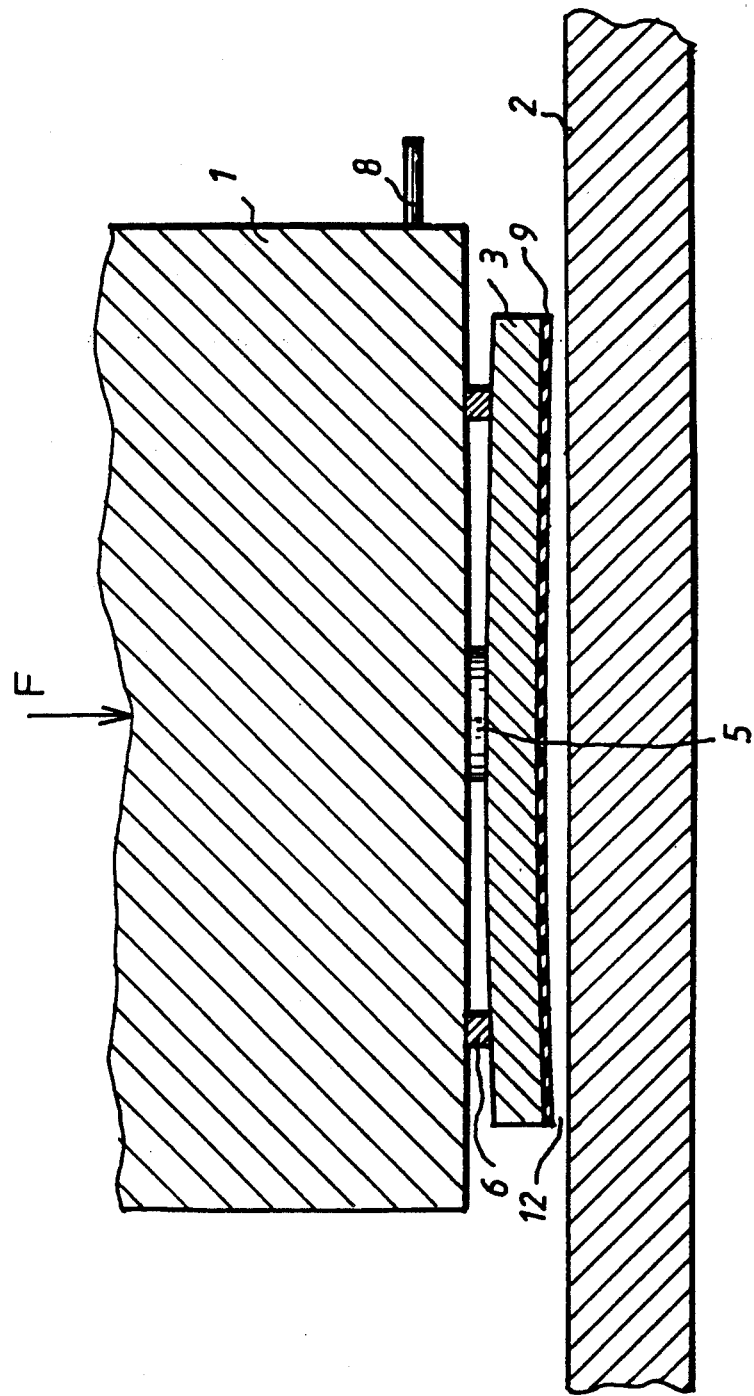

GAS PRESSURE BEARING

TECHNICAL FIELD

The invention relates to load-compensating gas bearings for use in precision machinery, e.g., measuring instruments.

BACKGROUND

For precision machinery, it is often necessary to have bearings of very high stiffness, i.e., bearings of sufficient rigidity so that the bearing gap does not vary under changes in load. Gas pressure bearings are often used for this purpose, particularly for instrument components that must be moved easily and with extreme precision on a support. In order to attain the required precision, it is necessary that highly rigid bearings be used, whereby the bearing span is maintained substantially constant independent of the load on the bearing.

A gas pressure bearing of this type is disclosed in U.S Pat. No. 4,560,213, and it consists of a base element that is provided with a gas inlet and connected rigidly with a membrane. The connecting elements are configured in such a manner that they act as rocker bearings and permit deformation of the membrane—specifically its concave deformation—as a result of the bearing pressure. The total rigidity of this prior art gas pressure bearing is determined substantially by its mechanics, i.e., the mechanical connection between the base element that forms its bearing and the component to be supported. Further, the rocker bearings supporting the deformable membrane are somewhat elastic, having a disadvantageous effect on total rigidity..

Therefore, the invention herein is directed to the creation of a gas pressure bearing that is distinguished by (a) extremely high total rigidity, (b) an extensive load range, and, in addition, (c) only a few simple components.

SUMMARY OF THE INVENTION

Like the prior art referred to above, the gas pressure bearing according to our invention also uses a deformable membrane as one of the boundaries of the bearing interspace. However, in our invention, the membrane is a separate component which is supported by a circular support and is held and centered only by a cylindrical insert. Gas is supplied to the baring side of the membrane via the cylindrical insert.

In one preferred embodiment, the circular support is rigidly connected directly with the component being supported by the bearing, and no additional mechanical connection is used between the gas pressure bearing and the components; so the total rigidity of the bearing is determined only by the rigidity of the bearing span. Inasmuch as the membrane is supported without being fixed, it can be deformed to a considerably greater degree by a given load than can prior art bearings having a fixed membrane. In fact, the rigidity of the bearing span even becomes negative, i.e., the bearing is lifted more as the load is increased. Therefore, an almost infinitely high total rigidity can be attained.

In other embodiments of out invention, the circular support is firmly mounted to an intermediate base element that, in turn, is connected mechanically with the component to be supported; and the membrane is similarly supported, without being fixed, to provide the improved performance just described above. That is, with the greater deformation capacity of our membrane and with the negative rigidity of our bearing span, the total rigidity of our bearing provides a significant improvement over conventional known gas pressure bearings.

Because our bearing is highly rigid, it can be used in areas where greater loads are applied and where conventional bearings cannot be used. For example, areas supported by prior art bearings can be supported with fewer bearing elements according to our invention.

Further, our gas pressure bearing uses only a few simple components; and its deformable membrane can be simply and readily replaced, permitting the selective use of membranes of different thicknesses or those consisting of different materials.

In one particularly advantageous embodiment, a membrane is used which is coated on the bearing side with a hard plastic sliding material. This makes the bearing particularly effective in case of emergency operations, i.e., operations when the gas supply is inadvertently discontinued.

U.S. Pat. No. 4,710,034 discloses an air bearing for rotating shafts in which the shafts are covered with molded elements of a plastic material to prevent destruction of the bearing in the event of such emergency operation. One plastic suggested in that patent, namely, hard polyvinyl chloride, has been found particularly appropriate for coating the membrane of our inventive gas pressure bearing.

In another feature of our invention, the cylindrical insert is used to attach the membrane to the component that supports the circular support. Therefore, the insert centers and fixes the membrane relative to the circular support and, at the same time, is used to deliver gas from the inlet to the bearing span. Thus, the gas outlet of the cylindrical insert may be designed to act as an air filter or as an orifice. By providing a variety of inserts with different diameters of orifice, the characteristic of the bearing can be adapted easily to different needs just by exchanging the insert. For example, an orifice with a larger diameter can be used to increase the air throughput and also the bearing gap, to accommodate for poor surface quality of the supporting guide the bearing runs on. On the other hand, if the support guide has a highly polished surface of good quality, the bearing can be optimized for low air consumption by using an insert with a smaller diameter orifice.

In still another embodiment of our gas pressure bearing, the pressure in the space above the membrane is also selectively controlled to adjust and enhance the deformation of the membrane.

The gas pressure bearing in accordance with the invention herein is appropriate for supporting precision machine parts and is particularly suitable as a high-precision bearing for supporting parts of a machine used for measuring multiple coordinates.

DRAWINGS

FIG. 3 is the bearing of FIG. 1 shown in its operative position, wherein the relative size of the bearing span has been exaggerated for clarity.

DETAILED DESCRIPTION

Figure 1:
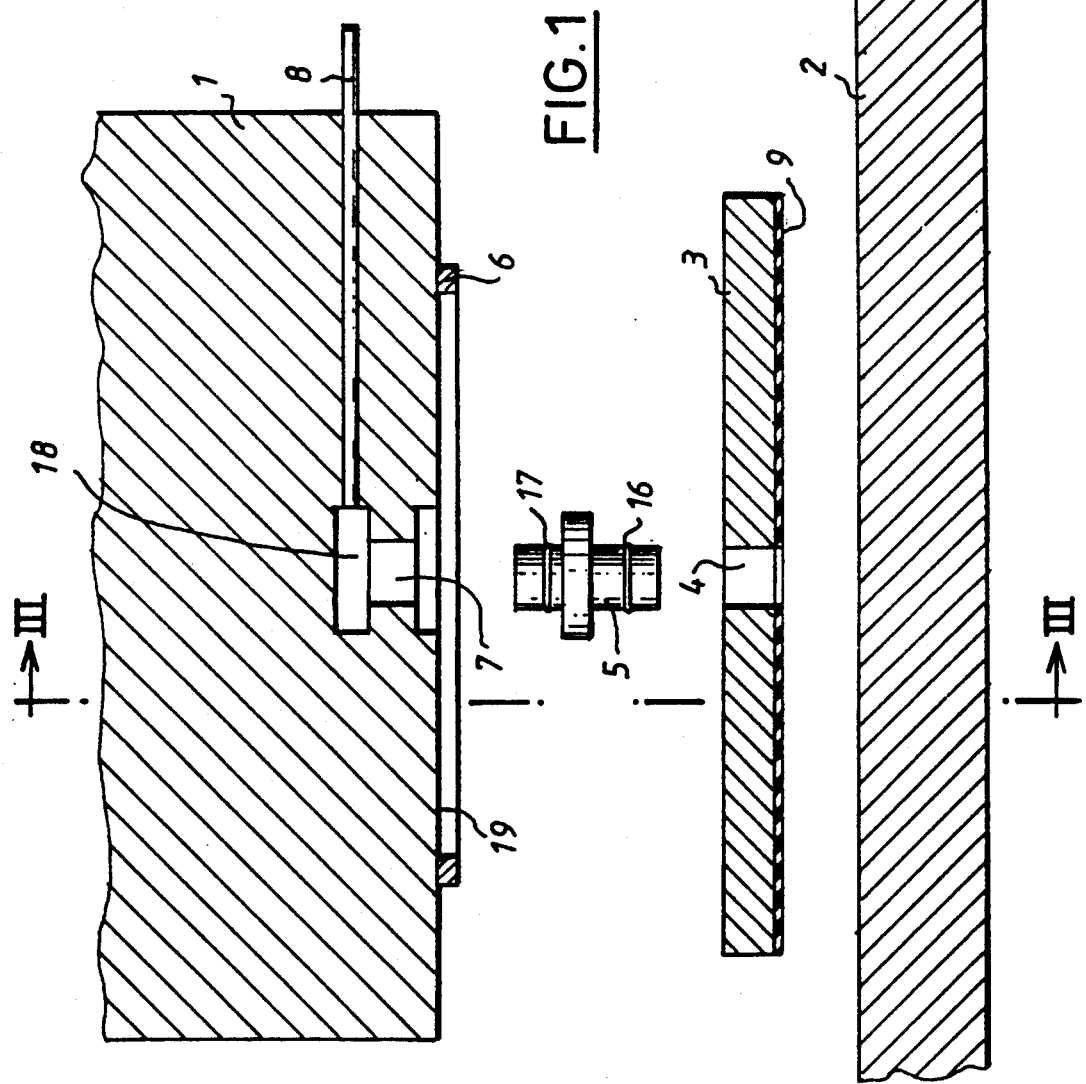
FIG. 1 is an exploded view of a first embodiment of the invention.

FIG. 1 shows a preferred embodiment of our invention acting as a bearing for a machine part 1 on a support 2. The bearing itself consists of a round disk 3 with a center bore 4, a cylindrical insert 5, and a circular support 6 that, as illustrated, is mounted directly to the part 1 being supported. Cement may be used, for example, to mount circular support 6. Within the boundary of circular support 6, machine part 1 has a center bore 7 connected with a gas inlet 8.

Disk 3 serves as the membrane of the gas pressure bearing. Its surface facing support 2 has a coating 9 of a commercially available plastic sliding material. Coating 9, for example, has a thickness of approximately 1 mm and is smooth on its exposed side and has been planed. It imparts to the bearing certain advantageous emergency-operation properties in the case the gas supply is disrupted, causing disk 3 to be seated directly on support 2. Disk 3 itself consists, for example, of an aluminum alloy.

Figure 2:
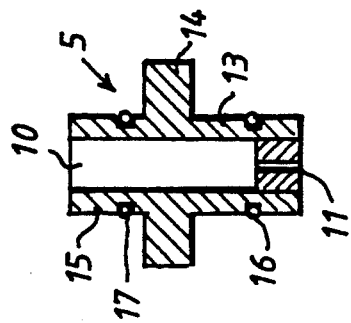
FIG. 2 is a longitudinal section of the cylindrical insert shown in FIG. 1.

Cylindrical insert 5, which is shown in cross section in FIG. 2, has a center bore 10. An orifice 11 is inserted in the end of bore 10 which faces the bearing side of disk 3. A bearing span 12 is created between the lining 9 of disk 3 and support 2, and air enters bearing span 12 Via orifice 11. Insert 5 consists of three successive coaxial sections 13, 14, 15. The first section 13, which supports orifice 11, is inserted in center bore 4 of disk 3. The second section 14 is configured as a disk having a diameter greater than that of first section 13; while the third section 15, in turn, has a smaller diameter than disk 14. Insert 5 has a pair of O-rings 16 and 17 positioned, respectively, around first section 13 and third section 15.

Center bore 7 in machine part 1 is shaped to complement and mate in a form-locking manner with sections 14 and 15 of insert 5. Adjoining bore 7 is a chamber 18 which communicates with gas inlet 8.

Insert 5 and bores 4 and 7 are designed so that, when insert 5 is assembled in machine part 1 and disk 3, the bearing-side surface of disk 14 of insert 5 forms a plane with the surface 19 of part 1 located inside circular support 6. The gas, preferably air, is supplied through inlet 8, chamber 18, and bore 10; and it exits on the bearing side of disk 3 through orifice 11 into bearing span 12.

FIG. 3 illustrates the operation of the gas pressure bearing. Machine part 1 exerts a force F in the direction of the arrow. This force tries to compress bearing span 12, thereby increasing the pressure in the span. When subjected to this pressure, disk 3 is deformed in a concave manner. Because disk 3 is supported without being fixed to circular support 6, this deformation is not impaired, i.e., the shape of disk 3 is not affected by any arbitrary structural influences. As a result of this deformation of disk 3, the distance between the central portion of the bearing-side surface of disk 3 and support 2 is again returned to the state in which no load was applied.

Figure 6:
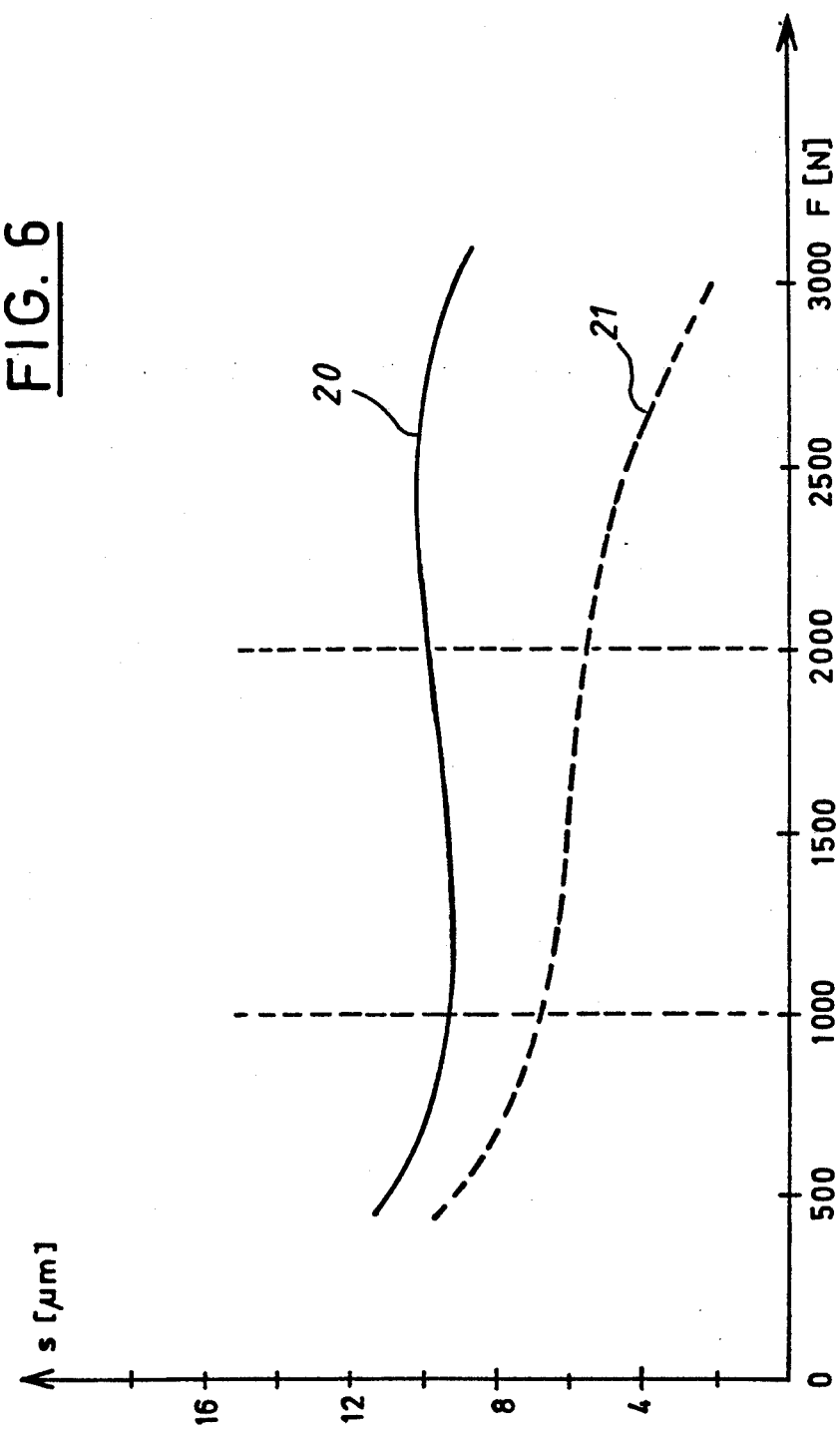
FIG. 6 is a graphic comparison of the effect of increasing load on the load-bearing span of a conventional prior art gas bearing and a gas pressure bearing according to the invention.

As shown by the characteristic curve 20 of FIG. 6, our gas pressure bearing's span becomes larger as the load F is increased, i.e., the bearing is lifted more than in the no-load state. Therefore, the rigidity of the bearing span is negative. Inasmuch as the reciprocal value of this rigidity is entered in the formula expressing the total rigidity of the bearing, the total rigidity reaches very high values.

Curve 20 of FIG. 6 also shows clearly that our gas pressure bearing can be used with a very large range of loads (e.g., 1000/2000 N). This load range is significantly greater than that of a conventional gas pressure bearing, the characteristic curve 21 of which is also shown in FIG. 6.

As can be seen from the embodiment illustrated in FIGS. 1 and 2, our gas pressure bearing consists of only a few simple components. Each of the major components, e.g., the membrane of the bearing (i.e., disk 3), as well as insert 5, and hence the orifices 11 for the gas outlet, can be exchanged rapidly and easily. The bearing in accordance with FIGS. 1 and 2 is also distinguished by extremely low construction height. Furthermore, it exhibits good emergency-operation properties; and, of prime concern, the total rigidity of this bearing is extremely high.

Exemplary uses of the embodiment of FIGS. 1 and 2 include solid bearings, wherein circular support 6 is mounted in a fixed manner directly to the machine part 1 which is to be supported. However, there are also machine designs that do not readily permit the use of such solid bearings, and the embodiments of FIGS. 4 and 5 are intended for those applications.

Figure 4:
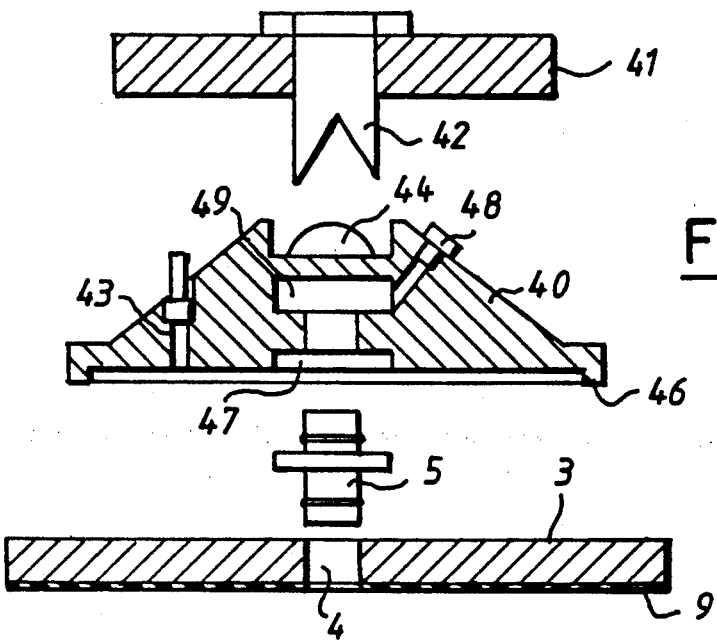
FIG. 4 is an exploded view of a second embodiment of the invention.
Figure 5:
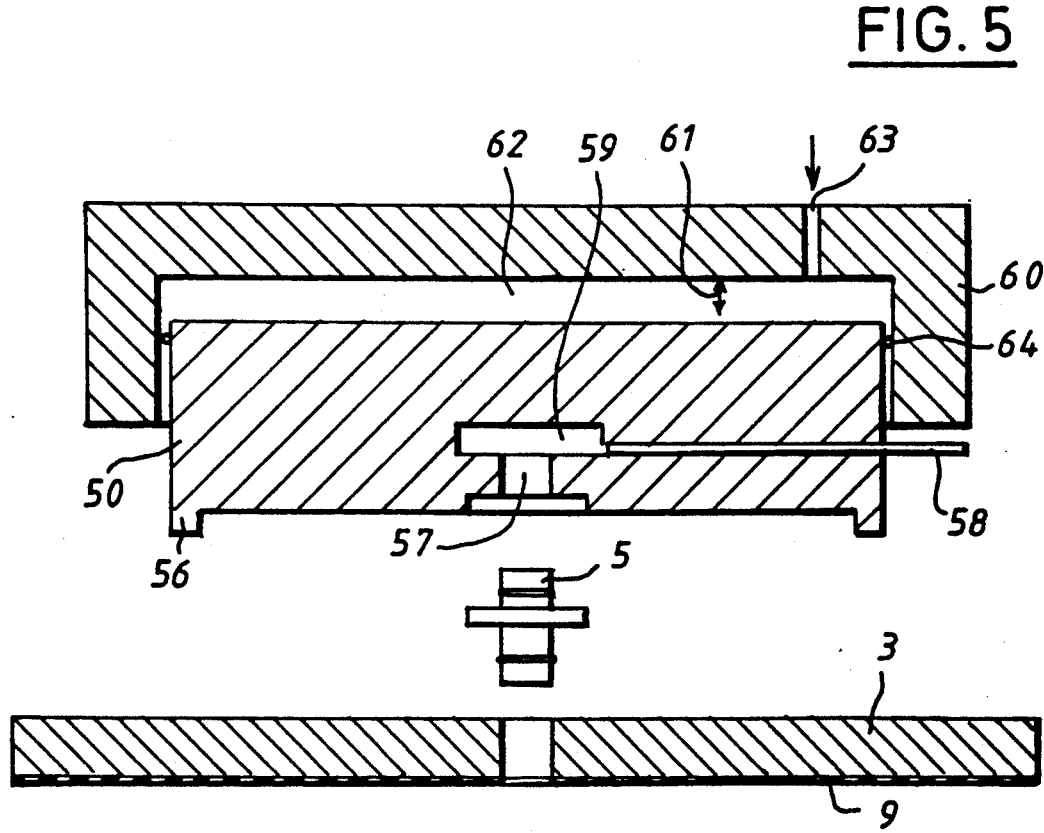
FIG. 5 is an exploded view of a third embodiment of the invention.

FIG. 4 shows a base element 40 which is provided with a gas inlet 48. The internal bore 47 of the base element 40 has the same form as the bore 7 of FIG. 1. It is used for receiving cylindrical insert 5, which is also received into the center bore 4 of disk 3. Gas inlet 48 communicates with the bore of insert 5 via an internal chamber 49.

In the embodiment shown in FIG. 4, a circular support 46 is machined directly in base element 40. Of course, it is also possible to mount the circular support in another manner, e.g., it can be manufactured as a separate component and joined with base element 40.

Base element 40 supports a bearing ball 44 that comes into cooperative engagement with a support 42 that is rigidly mounted to the component 41 being supported.

Base element 40 is provided with a further gas delivery channel 43, which communicates with the internal bearing chamber that is defined by base element 40, circular support 46, and disk 3. Air may be discharged for example, via this bore; and, as a result, the concave deformation of the disk may be increased or decreased when a load is applied.

Of course, it is also possible to provide an additional bore similar to channel 43 in the embodiment shown in FIGS. 1 through 3, for purposes of providing additional ventilation or for the discharge of air from the internal bearing chamber.

The further embodiment illustrated in FIG. 5 consists of a base element 50 to which a circular support 56 is rigidly mounted. A bore 57 accommodates insert 5, and gas is supplied through insert 5 via a gas inlet 58 and a chamber 59.

Base element 50 is supported in a circular housing 60 in such a manner that its height can be adjusted in the direction of the double arrow 61. An O-ring 64 provides a gas-tight seal for the internal chamber 62. A bore 63 leading into the chamber permits the adjustment of pressure in the chamber 62, and hence the adjustment of the bearing force.

Of course, other embodiments of the base elements (40 and 50, respectively) are possible. Such base elements would include a circular support that supports disk 3 without being fixed to it. As is obvious from FIGS. 4 and 5, base elements of this type can be exchanged easily and rapidly, providing a modular system that requires only one simple design for insert 5 and disk 3.

We claim:

1. A gas pressure bearing, formed as a chamber having its bearing side configured as a concave membrane which is deformable by bearing pressure, comprising:
   a base element connected to a machine component and supported by said bearing;
   said deformable concave membrane being a disk having a through bore positioned at its center;
   a circular support mounted to said base element for supporting said disk without being fixed to said disk;
   a bore formed in said base element inside said circular support, said bore communicating with a gas inlet; and
   a cylindrical insert having a bore,
   said cylindrical insert being configured to be received and fitted within said bores of both said base element and said disk in a form-locking manner.

2. The gas pressure bearing of claim 1 wherein said machine component itself comprises said base element.

3. The gas pressure bearing of claim 1 wherein said base element is separate from said machine component and is connected thereto by a mechanical support.

4. The gas pressure bearing of claim 3 wherein said mechanical support that connects said base element to said machine component comprises a ball bearing support.

5. The gas pressure bearing of claim 1 wherein said base element is separate from said machine component and is connected thereto by a fluid support.

6. The gas pressure bearing of claim 1 wherein the bearing side of said disk is covered by a plastic material.

7. The gas pressure bearing of claim 6 wherein said plastic material is polyvinyl chloride.

8. The gas pressure bearing of claim 1 wherein said bore of said cylindrical insert has one end positioned in proximity to the bearing side of said disk, said one end of said bore further comprising an orifice for acting as a gas outlet.

9. The gas pressure bearing of claim 8 wherein said cylindrical insert further comprises:
   a first coaxial section, a second coaxial section, and a third coaxial section;
   said first coaxial section supporting said orifice and being configured as a cylinder having a diameter mating in said form-locking manner with said center bore of said disk;
   said second coaxial section being configured as a cylinder having a bearing-side surface with a diameter greater than said diameter of said first coaxial section;
   said third coaxial section having a diameter smaller than said diameter of said second coaxial section;
   the surface of said base element inside said circular support being a plane; and
   said diameters of said second and third coaxial sections being configured to mate in said form-locking manner with said bore formed in said base element so that
   said bore is in communication with said gas inlet, and
   said bearing-side surface of said second coaxial section lies in the plane of said surface of said base element.

10. The gas pressure bearing of claim 9 wherein said cylindrical insert further comprises:
    a first O-ring and a second O-ring;
    said first O-ring being positioned around said first coaxial section; and
    said second O-ring being positioned around said third coaxial section.

11. The gas pressure bearing of claim 1 wherein said base element further comprises a gas-delivery connection for delivering gas to and from the chamber formed between said disk, said circular support, and the surface of said base element.

12. The gas pressure bearing of claim 1 wherein said machine component comprises part of a machine used for measuring multiple coordinates.

* * * * *